United States Patent [19]

Ueda et al.

[11] 4,370,455

[45] Jan. 25, 1983

[54] PROCESS FOR POLYMERIZING OR COPOLYMERIZING OLEFINS

[75] Inventors: Takashi Ueda; Syuji Minami; Mamoru Kioka, all of Ohtake; Norio Kashiwa, Iwakuni, all of Japan

[73] Assignee: Mitsui Petrochemical Industries Ltd., Tokyo, Japan

[21] Appl. No.: 101,470

[22] Filed: Dec. 10, 1979

[30] Foreign Application Priority Data

Dec. 11, 1978 [JP] Japan ................. 53-151999

[51] Int. Cl.$^3$ .................... C08F 4/02; C08F 10/00
[52] U.S. Cl. ..................... 526/125; 252/429 B; 526/348; 526/352
[58] Field of Search .......................... 526/125

[56] References Cited

U.S. PATENT DOCUMENTS 4,071,674 1/1978 Kashiwa et al. ............ 526/125
4,189,553 2/1980 Birkelbach ................. 526/151

FOREIGN PATENT DOCUMENTS 1358437 7/1974 United Kingdom ............ 526/124

*Primary Examiner*—Edward J. Smith
*Attorney, Agent, or Firm*—Sherman & Shalloway

[57] ABSTRACT

In a process for producing a polymer or copolymer of an alpha-olefin which comprises continuously polymerizing or copolymerizing the alpha-olefin or the alpha-olefin with up to 5 mole % of a diolefin in the presence of a catalyst comprising a transition metal catalyst component and an organoaluminum catalyst component, the improvement wherein:

(I) said polymerization or copolymerization is carried out in the presence of a catalyst composed of (A) a solid magnesium compound obtained by reacting (i) an adduct between a magnesium halide and an electron donor, with (ii) an organometallic compound of a metal of Groups I to III of the Mendelejeff's periodic table, (B) a liquid transition metal compound, and (C) an organoaluminum compound, and (II) said continuous polymerization or copolymerization is carried out while feeding the compound (B) separately from the other compounds (A) and (C) into a polymerization or copolymerization zone.

9 Claims, No Drawings

PROCESS FOR POLYMERIZING OR COPOLYMERIZING OLEFINS

This invention relates to a process for polymerizing or copolymerizing alpha-olefins which can afford a polymer or copolymer of an alpha-olefin having a narrow distribution of molecular weight with commercial advantage without the need for a reaction step of supporting a transition metal compound on a magnesium-containing carrier.

More specifically, this invention provides in a process for producing a polymer or copolymer of an alpha-olefin which comprises continuously polymerizing or copolymerizing the alpha-olefin or the alpha-olefin with up to 5 mole% of a diolefin in the presence of a catalyst comprising a transition metal catalyst component and an organoaluminum catalyst component, the improvement wherein:

[I] said polymerization or copolymerization is carried out in the presence of a catalyst composed of
(A) a solid magnesium compound obtained by reacting:
  (i) an adduct between a magnesium halide and an electron donor, with (ii) an organometallic compound of a metal of Groups I to III of the Mendelejeff's periodic table,
(B) a liquid transition metal compound, and
(C) an organoaluminum compound, and
[II] said polymerization or copolymerization is carried out while feeding the compound (B) separately from the other compounds (A) and (C) into a polymerization or copolymerization zone.

West German Laid-Open Patent Publication No. 2,346,471 discloses a process for polymerizing or copolymerizing olefins in the presence of a catalyst composed of (a) a transition metal catalyst component prepared by reacting a titanium or vanadium compound with the reaction product of a magnesium dihalide solid carrier, which is an adduct between a magnesium dihalide and an alcohol, and an organometallic compound of a metal of Groups I to III of the periodic table, and (b) an organometallic compound of a metal of Groups I to III of the periodic table. In this patent document, it is stated that prior to polymerization, a reaction of supporting a transition metal compound on the aforesaid solid carrier is carried out, and the resulting carrier-supported catalyst ingredient and the organoaluminum compound are fed into a polymerization zone.

The present inventors further studied the aforesaid catalyst system, and found that in order to narrow the molecular weight distribution of an olefin polymer or copolymer, or to provide an olefin copolymer of a narrower distribution of composition and higher transparency, in a continuous polymerization process, it is necessary that a solid magnesium compound (A), a liquid transition metal compound (B) and an organoaluminum compound (C) should be used without performing the aforesaid supporting reaction, and the continuous polymerization or copolymerization should be carried out while feeding the compound (B) separately from the solid compound (A) and the compound (C) into a polymerization zone. It has also been found that use of this expedient leads to complete removal of the trouble of pollution by waste matter containing transition metal compounds which occurs in the aforesaid supporting reaction in the prior technique.

It is an object of this invention therefore to provide a process for polymerizing or copolymerizing olefins, which permits omission of a supporting reaction conventionally used to provide a highly active catalyst containing a magnesium compound.

Another object of this invention is to provide a process for polymerizing an olefin with high activity which can afford a polyolefin having a narrow molecular weight distribution.

Still another object of this invention is to provide a process for copolymerizing olefins, which can afford copolymers of olefins having a narrow distribution of composition and good transparency.

The above and other objects and advantages of this invention will become more apparent from the following description.

Examples of suitable magnesium halides used to form the solid magnesium compound (A) in the process of this invention include magnesium chloride, magnesium bromide, magnesium iodide and magnesium fluoride. Magnesium chloride is preferred. There can also be used magnesium halides having organic groups other than hydrocarbon groups such as alkoxy or aryloxy groups. Magnesium dihalides are preferred. Commercially available magnesium halides may be directly used as such magnesium halides. Alternatively, there can be used compounds obtained by halogenating other magnesium compounds or metallic magnesium with halogenating agents such as silicon tetrachloride, hydrogen chloride, halogenated hydrocarbons and chlorine.

The compound (A) used in this invention can be obtained by reacting (i) an adduct between a magnesium halide (as exemplified hereinabove) and an electron donor with (ii) an organometallic compound of a metal of Groups I to III of the Mendelejeff's periodic table.

Examples of the electron donor used to form the aforesaid adduct are oxygen-containing electron donors such as alcohols, phenols, ketones, aldehydes, carboxylic acids, acid halides, esters, ethers and acid amides; and nitrogen-containing electron donors such as ammonia, amines, nitriles and isocyanates.

Specific examples of these electron donors include alcohols having 1 to 18 carbon atoms, for example, aliphalic alcohols such as methanol, ethanol, propanol, pentanol butanol, 2-ethylbutanol, 2-methylpentanol, hexanol, 2-ethylhexanol, heptanol, octanol, dodecanol, tetradecyl alcohol, octadecyl alcohol, n-butyl Cellosolve, 1-butoxy-2-propanol, undecenol and ethylene glycol; alicyclic alcohols such as cyclohexanol and methylcyclohexanol; aromatic alcohols such as benzyl alcohol, phenethyl alcohol, cumyl alcohol, methyl benzyl alcohol, isopropyl alcohol, α-methyl benzyl alcohol and α,α-dimethyl benzyl alcohol; phenols having 6 to 15 carbon atoms optionally containing a lower alkyl group, such as phenol, cresol, xylenol, ethylphenol, propylphenol, cumylphenol and naphthol; ketones having 3 to 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthoaldehyde; carboxylic acids having 2 to 18 carbon atoms such as formic acid, acetic acid, propionic acid, butylic acid, valeric acid, capric acid, 2-ethyl hexanoic acid, undecaic acid, nonylic acid and octanoic acid; organic acid esters having 2 to 18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarine, phthalide, and ethylene carbonate; acid halides having 2 to 15 carbon atoms such as acetyl chloride, benzyl chloride, tolyl chloride and anisyl chloride; ethers having 2 to 20 carbon atoms such as methyl ether, ethyl ether, isopropyl ether, butyl ether, amyl ether, tetrahydrofuran, anisole and diphenyl ether; acid amides such as acetamide, benzamide and toluamide; amines such as methylamine, ethylamine, diethylamine, tributylamine, heptylamine, octylamine, nonylamine, decylamine, undecylamine, 2-ethylhexylamine, decylamine, laurylamine aniline, tribenzylamine, pyridine, picoline and tetraethylenediamine; and nitriles such as acetonitrile, benzonitrile and tolunitrile.

The adduct (i) can be formed by contacting the magnesium halide with the electron donor in the presence or absence of an inert hydrocarbon solvent at a temperature of, say, 0° to about 300° C. for about 10 minutes to about 48 hours. The electron donor may be used in an amount of about 0.1 to about 30 moles, preferably 0.5 to 20 moles, especially preferably 0.5 to 10 moles, per mole of the magnesium halide. When the reaction is to be carried out in the presence of the inert solvent, the magnesium halide is preferably suspended in the inert solvent during reaction with the electron donor. The magnesium halide/electron donor adduct (i) is obtained either as a suspension or as a solution in the inert solvent although this differs depending upon the type and amount of the electron donor, the reaction temperature, the reaction pressure, the type of the inert solvent, etc. Any of these forms of the adduct can be used in this invention. The use of a compound (A) obtained by reacting the adduct (i) as a solution in the inert solvent with the organometallic compound (ii) is preferred because it will lead to polymers having a narrower molecular weight distribution and to copolymers having a narrower distribution of composition.

The inert solvent may be selected from aliphatic hydrocarbons, alicyclic hydrocarbons, aromatic hydrocarbons and halogen derivatives of these which are the same as those exemplified as the polymerization solvent used in the process of this invention.

The production of the adduct (i) soluble in the inert solvent is specifically described below.

When an alcohol is used as the electron donor, its amount may be preferably at least 1 mole, more preferably about 2.3 to about 20 moles, especially preferably about 2.8 to about 10 moles, per mole of the magnesium halide. When a magnesium dihalide is used as the magnesium halide, the alcohol is used in an amount of preferably at least 2.3 moles, more preferably about 2.5 moles to about 20 moles, especially preferably about 2.8 moles to 10 moles, per mole of the magnesium halide.

When an aliphatic hydrocarbon and/or an alicyclic hydrocarbon is used as the hydrocarbon solvent, it is preferred that at least about 0.5 mole, especially at least about 0.7 mole, per mole of the magnesium halide of an alcohol having at least 6 carbon atoms should be used as part of the alcohol used in the above-mentioned preferred amount. At this time, the remainder may consist of an alcohol having 5 or less carbon atoms. When a magnesium dihalide is used as the halogen-containing magnesium halide at this time, it is advisable to use at least about 1.2 moles, preferably at least about 1.5 moles, per mole of the magnesium dihalide, of an alcohol having at least 6 carbon atoms. In this manner, the total amount of alcohols required to solubilize the magnesium halide can be maintained low and the resulting catalyst ingredient has high activity. If only an alcohol having 5 or less carbon atoms is used, it is preferable to use it in an amount of at least about 15 moles per mole of the halogen-containing magnesium compound.

On the other hand, when an aromatic hydrocarbon is used as the hydrocarbon solvent, the halogen-containing magnesium compound can be solubilized by using the alcohol in an amount of at least 1 mole per mole of the halogen-containing magnesium compound irrespective of the type of the alcohol.

Liquefaction of the magnesium halide can be effectively done even by using a carboxylic acid having at least 7 carbon atoms or an amine having at least 6 carbon atoms instead of the alcohol having at least 6 carbon atoms.

Contacting of the magnesium halide with the alcohol is carried out preferably in an inert hydrocarbon solvent, at a temperature of, for example, at least about 65° C., preferably at about 80° C. to 300° C. more preferably about 100° to about 200° C., for a period of about 15 minutes to about 5 hours, preferably about 30 minutes to about 2 hours.

One method for producing the adduct (i) in the absence of an inert solvent comprises suspending or dissolving the magnesium halide in the electron donor, and reacting them under similar conditions to those used in the presence of the inert solvent. Another method involves contacting the magnesium halide with the electron donor by mechanically pulverizing them.

Mechanical contacting of the magnesium halide with the electron donor can be performed by charging the magnesium halide and an amount of the electron donor which does not impair the pulverizing effect (up to about 1 mole per mole of magnesium halide although the amount varies depending upon the type of the electron donor) into a pulverizer such as a rotary ball mill, vibratory ball mill or impact mill or a mixer having pulverizing ability, and co-pulverizing these materials at room temperature for a period of, say, 5 to 72 hours, preferably 10 to 48 hours.

Examples of the organometal compound (ii) to be reacted with the adduct (i) in this invention are shown below.

(1) Organoaluminum compounds having at least one aluminum-carbon bond in the molecule, for example those of the general formula:

$$R^1{}_m Al(OR^2)_n H_p X_q$$

wherein $R^1$ and $R^2$ are identical or different and represent a hydrocarbon group having 1 to 5 carbon atoms, preferably 1 to 4 carbon atoms, preferably a group selected from alkyl and alkenyl groups, X represents halogen, m is a number in the range of $0 < m \leq 3$, n is a number in the range of $0 \leq n < 3$, p is a number in the range of $0 \leq p < 3$, and q is a number in the range of $0 \leq q < 3$ and $m+n+p+q=3$.

(2) Complex alkylated products between a metal of Group 1 and aluminum expressed by the general formula:

$$M^1 Al R^1{}_4$$

wherein $M^1$ represents Li, Na or K, and $R^1$ is as defined in (1) above.

(3) Dialkyl compounds of a metal of Group 2 expressed by the general formula:

$$R^1R^2M^2$$

wherein $R^1$ and $R^2$ are as defined above, and $M^2$ represents Mg, Zn or Cd.

Examples of the organoaluminum compounds within the category (1) above are as follows:

$$R^1{}_mAl(OR^2)_{3-m}$$

wherein $R^1$ and $R^2$ are as defined above, and m is preferably a number in the range of $1.5 \leq m < 3$:

$$R^1{}_mAlX_{3-m}$$

wherein $R^1$ is as defined above, X is halogen, m is preferably a number in the range of $0 < m < 3$:

$$R^1{}_mAlH_{3-m}$$

wherein $R^1$ is as defined above, m is preferably a number in the range of $2 \leq m < 30$:

$$R^1{}_mAl(OR^2)_nX_q$$

wherein $R^1$ and $R^2$ are as defined above, X is halogen, $0 < m \leq 3$, $0 \leq n < 3$, $0 \leq q < 3$, and $m+n+q=3$.

Specific examples of the organoaluminum compounds (1) above are trialkyl aluminums such as triethylaluminum and tributyl aluminum; trialkenyl aluminums such as triisoprenyl aluminum; partially alkoxylated alkyl aluminums, for example, dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; compounds having an average composition expressed by $R^1{}_{2.5}Al(OR^2)_{0.5}$; partially halogenated alkyl aluminums, for example, dialkyl aluminum halogenides such as diethyl aluminum chloride, dibutyl aluminum chloride and diethyl aluminum bromide; alkyl aluminum sesquihalogenides such as ethyl aluminum sesquichloride, butyl aluminum sesquichloride and ethyl aluminum sesquibromide; alkyl aluminums dihalides such as ethyl aluminum dichloride, propyl aluminum dichloride and butyl aluminum dibromide; partially hydrogenated alkyl aluminums, for example, dialkyl aluminum hydrides such as diethyl aluminum hydride and dibutyl aluminum hydride, alkyl aluminum dihydrides such as ethyl aluminum dihydride and propyl aluminum dihydride; and partially alcoholated and halogenated alkyl aluminums, for example, alkyl aluminum alkoxyhalides such as ethyl aluminum ethoxychloride, butyl aluminum butoxychloride and ethyl aluminum ethoxybromide.

Examples of the compound belonging to (2) are $LiAl(C_2H_5)_4$ and $LiAl(C_7H_{15})_4$. Examples of the compound belonging to (3) are diethylzinc and diethylmagnesium. Alkyl magnesium halides such as ethyl magnesium chloride can also be used. If desired, two or more of these may be used as a mixture. The trialkyl aluminums and/or alkylaluminum halides are especially preferred.

In the present invention, the reaction between the adduct (i) and the organometallic compound (ii) can be performed by adding the organometallic compound (ii) to the adduct (i) dissolved or suspended in the above-exemplified inert solvent. The reaction temperature is, for example, 0° to 100° C. The amount of the organometallic compound (ii) may, for example, be at least $\frac{1}{8}$ mole, preferably $\frac{1}{2}$ to 50 moles, per mole of the electron donor present in the insert solvent.

The compound (A) is obtained as a suspension of a powdery solid compound (A) irrespective of whether the adduct is soluble or insoluble in the inert solvent. The solid is a complex compound containing an organic group and aluminum and having a structure similar to extremely amorphous magnesium chloride when the magnesium halide is magnesium chloride, the electron donor is an alcohol and the organometallic compound of a metal of Groups I to III of the periodic table is an organoaluminum compound. Its chemical composition can be expressed by the following formula:

$$MgCl_2 \cdot yAl(OR)_\alpha R_\beta X_{3-(\alpha+\beta)}$$

wherein R is an alkyl group, X is a halogen atom, y is a number in the range of 0.2 to 0.5, and $0 < \alpha, \beta < 3$.

When the reaction product is separated into a solid and a liquid, the liquid layer does not show any catalytic activity, and the solid portion is a catalytic ingredient having high activity. The liquid layer, however, does not adversely affect the catalytically active solid portion. Accordingly, no operation of performing solid-liquid separation is necessary, and the reaction product can be directly fed into a polymerization zone.

In the aforesaid example, a catalytic ingredient having higher activity can be obtained by performing the reaction such that the number of moles of the organic groups in the organoaluminum compound is more than the number of moles of the hydroxyl groups of the alcohol added to magnesium chloride. Since the reaction product is obtained as a suspension in an inert solvent, it can be directly fed into a polymerization zone without subjecting it to an isolating operation. The reaction can also be performed by the mechanically contacting method as described hereinabove. In this case, the powder obtained by the treatment may be suspended in the inert solvent, and the suspension may be fed into the polymerization zone.

Titanium or vanadium compounds are preferred as the liquid transition metal compound (B) used in this invention. Examples of the titanium compounds are tetravalent titanium compounds of the formula $Ti(OR)_nX_{4-n}$ wherein R represents a hydrocarbon group, X represents a halogen atom, and $0 \leq n \leq 4$. In the above formula, R is, for example, a $C_1$-$C_{20}$ alkyl group, a $C_2$-$C_{20}$ alkenyl group, or a phenyl group. These groups may be substituted by halogen, lower alkyl, lower alkoxy, Specific examples of preferred titanium compounds are $TiCl_4$, $TiBr_4$, $TiI_4$, $Ti(OCH_3)Cl_3$, $Ti(OC_2H_5)Cl_3$, $Ti(OC_6H_5)Cl_3$, $Ti(OC_2H_5)_2Cl_2$, $Ti(OC_3H_7)_2Cl_2$, $Ti(OC_2H_5)_3Cl$, $Ti(OC_6H_5)_3Cl$, $Ti(OC_2H_5)_4$, $Ti(OC_3H_7)_4$, $Ti(OC_4H_9)_4$, $Ti(OC_6H_{13})_4$, $Ti(OC_6H_{11})_4$, $Ti(OC_8H_{17})_4$, $Ti[OCH_2(C_2H_5)CHC_4H_9]_4$, $Ti(OC_9H_{19})_4$, $Ti[OC_6H_3(CH_3)_2]_4$, $Ti(OCH_3)_2(OC_4H_9)_2$, $Ti(OC_3H_7)_3(OC_4H_9)$, $Ti(OC_2H_5)_2(OC_4H_9)_2$, $Ti(OC_2H_4Cl)_4$, $Ti(OC_2H_4OCH_3)_4$.

Other examples of the titanium compound are those of low atomic valency having any of crystal systems. Specific examples include titanium trihalides such as $TiCl_3$.T type obtained by the reduction of titanium tetrachloride with titanium metal, TiCl$_3$.A type obtained by reducing titanium tetrachloride with aluminum metal, TiCl$_3$.H type obtained by reducing titanium tetrachloride with hydrogen, and TiCl$_3$ obtained by reducing titanium tetrachloride with an organoaluminum compound such as (C$_2$H$_5$)$_3$Al, (C$_2$H$_5$)$_2$AlCl and (C$_2$H$_5$)$_{1.5}$AlCl$_{1.5}$, alkoxy titanium (III) compounds such as Ti(OCH$_3$)$_3$, Ti(OC$_2$H$_5$)$_3$, Ti(O n-C$_4$H$_9$)$_3$, Ti(OCH$_3$)Cl$_2$.2CH$_3$OH and Ti(OCH$_3$)$_2$Cl.CH$_3$OH, and TiCl$_2$ obtained by reducing TiCl$_3$ with hydrogen.

A normally solid transition metal compound such as titanium trichloride or titanium dichloride is used after it is subjected to a treatment of rendering it liquid. This treatment can be performed by contacting the transition metal compound with about 1 to about 24 moles, preferably about 3 to about 15 moles, per mole of the transition metal, of an electron donor such as an alcohol, ether, ester, amine or ketone. The same examples as given to the electron donor used in the formation of the adduct (i) can be cited for the electron donor used for this purpose. The transition metal compound is sometimes soluble only partly. In such a case, it is preferred to separate and use only the solubilized portion.

Compounds of the formula VO(OR)$_m$X$_{3-m}$ in which R and X are as defined above and $0 \leq m \leq 3$, or VX$_4$ may generally be used as the vanadium compounds. Specific examples are VOCl$_3$, VO(OC$_2$H$_5$)Cl$_2$, VO(OC$_2$H$_5$)$_3$, VO(OC$_2$H$_5$)$_{1.5}$-Cl$_{1.5}$, VO(OC$_4$H$_9$)$_3$, VO[OCH$_2$(CH$_2$)CHC$_4$H$_9$]$_3$, and VCl$_4$.

The organoaluminum compound (C) used in this invention may be those organoaluminum compounds exemplified hereinabove for the organometal compound (ii). Trialkyl aluminums and alkyl aluminum halides such as dialkyl aluminum halides or alkyl aluminum sesquihalides, and mixtures of these are preferred. When an excess of the organoaluminum compound is used as the organometallic compound (ii) used to treat the magnesium halide/electron donor adduct, the unreacted organoaluminum compound can be directly used as the compound (B).

According to the process of this invention, the continuous polymerization or copolymerization is carried out while feeding the compounds (A), (B) and (C) into the polymerization zone. At this time, the liquid transition metal compound (B) is fed into the polymerization zone separately from the other compounds (A) and (B).

Examples of the olefins used for the practice of the process of this invention include C$_2$-C$_{20}$, preferably C$_2$-C$_{12}$ alpha-olefins such as ethylene, propylene, 1-butene, 4-methyl-1-pentene, 1-hexene and 1-octene. They can be subjected not only to homopolymerization but also to random copolymerization or block copolymerization. In performing the copolymerization, a polyunsaturated compound such as a conjugated diene or nonconjugated diene in an amount of up to 5 mole% can be selected as a comonomer. The resulting olefin polymer or copolymer may be resinous or rubbery.

The process of this invention can afford polymers having a narrow distribution of molecular weight. However, this alone is not the objective of this invention, and polymers having a broad distribution of molecular weight may also be obtained by using a molecular weight controlling agent or by using a combination of two or more different sets of polymerization conditions.

When the process of this invention is applied to the copolymerization of two or more olefins, a copolymer can be obtained which has a narrow distribution of composition and good transparency. For example, polyolefins having good transparency can be produced by applying the process to the copolymerization of ethylene with another alpha-olefin or the copolymerization of propylene with another alpha-olefin.

In the present invention, the polymerization is carried out using the catalyst ingredients (A), (B) and (C) in the presence or absence of a hydrocarbon solvent. Examples of the hydrocarbon solvent are aliphatic hydrocarbons such as pentane, hexane, heptane, octane, decane, dodecane, and kerosene and the halogen derivatives thereof; alicyclic hydrocarbons such as cyclohexane and methylcyclohexane; and aromatic hydrocarbons such as benzene, toluene and xylene and the halogen derivatives thereof such as chlorobenzene. The olefin itself used in the polymerization may be used as a solvent.

The amount of the transition metal compound is such that the atomic ratio of the transition metal compound to magnesium in the compound (A) is preferably from about 0.005 to about 1, more preferably from about 0.01 to about 0.5, and especially preferably from about 0.033 to about 0.33. In the liquid-phase polymerization, it is desirable to select the concentration of the transition metal compound within the range of preferably from about 0.0005 to about 1 millimole, more preferably from about 0.001 to about 0.5 millimole, calculated as transition metal, and the concentration of the compound (A) within the range of preferably from about 0.0005 to about 200 millimoles, more preferably from about 0.001 to about 50 millimoles, calculated as magnesium atom, both per liter of the liquid phase. On the other hand, the organoaluminum compound is used desirably in an amount of about 5 to about 2000 moles, preferably from about 20 to about 500 moles, calculated as aluminum atom per mole of transition metal.

In the present invention, a continuous polymerization method is employed in which olefins are continuously fed into a polymerization zone and the resulting polymer is continuously discharged from the polymerization zone. Usually, the individual catalyst ingredients are continuously fed, but they may, if desired, be fed at short intervals. At this time, the compounds (A), (B) and (C) are separately fed into the polymerization zone. Or the compounds (A) and (C) are mixed in advance, and the resulting mixture and the compound (B) may be separately fed into the polymerization zone. In any case, the compound (C) is fed into the polymerization zone separately from the compounds (A) and (B).

The polymerization or copolymerization temperature in the present invention is generally about 20° to about 350° C., preferably about 65° to about 300° C. When an olefin polymer or copolymer having good transparency is desired, it is preferred to perform liquid-phase polymerization using an inert hydrocarbon solvent at a temperature at which the resulting olefin polymer or copolymer dissolves in the hydrocarbon solvent. For example, in the production of a copolymer resin by the copolymerization of ethylene with a minor proportion of another alpha-olefin, it is preferred to use a temperature which ranges from the melting point of the copolymer to about 300° C.

The polymerization pressure is generally from normal atmospheric pressure to about 100 kg/cm$^2$.G, preferably about 2 to about 50 kg/cm$^2$.G.

In performing the process of this invention, there may be used hydrogen, organometallic compounds of metals of Group II of the periodic table, and various electron donors such as alcohols, ethers, esters, amines, ketones, carboxylic acids, amides, phosphorus compounds, sulfur compounds, and acid anhydrides.

The following Examples illustrate the present invention further.

EXAMPLE 1

Commercially available anhydrous magnesium chloride (0.5 mole) was suspended in 1 liter of purified kerosene in an atmosphere of nitrogen, and 1.5 moles of 2-ethylhexanol was added. With stirring, the mixture was gradually heated, and reacted at 130° C. for 1.5 hours. The solid completely disappeared, and a colorless clear solution was obtained. When the solution was cooled to room temperature, no solid was precipitated, but the solution remained a colorless clear solution.

Then, 1.5 moles of triethyl aluminum was added dropwise to the solution at room temperature, and reacted for 1.5 hours. After the reaction, the mixture became a suspension of white powder. A part of the solid was taken out, washed, dried, and analyzed. The analysis led to the finding that the solid was a complex compound containing an aluminum compound bonded with an alkyl and an alkoxy group (by some interaction) which was similar to extremely amorphous magnesium chloride.

Magnesium was not detected from the liquid portion.

A 200-liter continuous polymerization reactor was fed continuously and separately with 100 liters/hr of dehydrated and purified hexane, 24 millimoles/hr of diethyl aluminum monochloride, 6 millimoles/hr, calculated as magnesium atom, of the resulting aluminum/magnesium complex obtained as above, and 0.3 millimole/hr, calculated as titanium atom, of a hexane solution of $Ti(OC_8H_{17})_4$. Ethylene was continuously fed into the polymerization reactor so that the pressure in the reactor reached 30 kg/cm$^2$. Thus, ethylene was polymerized at 140° C. with an average residence time of about 1 hour. The molecular weight of polyethylene was controlled by continuously feeding hydrogen.

The concentration of polyethylene was 117 g/liter, and the polymerization activity was 39,000 g of polyethylene/millimole of Ti. The polymer had a melt index of 4.3.

EXAMPLE 2

Commercially available magnesium chloride (0.24 mole) and 0.36 mole of ethanol were charged under a nitrogen atmosphere into a ball mill cyclinder made of stainless steel (SUS-32) and having an inner capacity of 800 ml and an inside diameter of 100 mm having 100 stainless steel (SUS-32) balls each having a diameter of 15 mm, and pulverizingly contacted at 125 rpm for 48 hours. After the pulverization, the product was taken out in a nitrogen box, and suspended in 1 liter of purified kerosene. Then, 0.36 mole of triethyl aluminum was added dropwise at room temperature, and the mixture was stirred for 1.5 hours.

Ethylene was polymerized in the same way as in Example 1 using the resulting aluminum-magnesium complex.

The conentration of polyethylene was 98 g/liter, which corresponded to a polymerization activity of 32,700 g of polyethylene/millimole of Ti. The polymer had a melt index of 5.6.

EXAMPLE 3

Commercially available anhydrous magnesium chloride (0.25 mole) was suspended in 1 liter of purified kerosene, and with stirring, 1.0 mole of butanol was added. They were reacted at room temperature for 1 hour. Furthermore, 1.0 mole of triethyl aluminum was added dropwise, and reacted at room temperature for 1.5 hours.

A 200-liter continuous polymerization reactor was charged continuously and separately with 100 liters/hr of dehydrated and purified hexane, 20 millimoles/hr of diethyl aluminum monochloride, 4.5 millimoles/hr, calculated as magnesium atom, of the resulting aluminum-magnesium complex, and 0.3 millimoles/hr, calculated as titanium atom, of a hexane solution of $Ti(O\text{ }n\text{-}C_4H_9)_4$, and ethylene was continuously fed into the polymerization reactor so that the pressure in the reactor reached 30 kg/cm$^2$. Ethylene was polymerized at 140° C. with an average residence time of about 1 hour. The molecular weight of the resulting polyethylene was controlled by continuously feeding hydrogen.

The concentration of polyethylene was 118 g/liter, which corresponded to a polymerization activity of 39,300 g of polyethylene/millimole of Ti. The polymer had a melt index of 3.8.

EXAMPLES 4 TO 6

Ethylene was continuously polymerized in the same way as in Example 3 except that the type of the transition metal compound and the organoaluminum compound fed at the time of polymerization were changed as shown in Table 1.

The results are shown in Table 1.

TABLE 1

| Example | Transition metal compound | Organoaluminum compound | Polymerization activity (g of PE/mmole of metal) | Melt index |
|---|---|---|---|---|
| 4 | $TiCl_4$ | $Et_2AlCl$ | 36,000 | 3.2 |
| 5 | $TiCl_3.6EHA$* | $Et_2AlCl$ | 35,200 | 4.3 |
| 6 | $VOCl_2(OC_2H_5)$ | $Et_{1.5}AlCl_{1.5}$ | 27,800 | 7.3 |

*0.2 mole of commercially available $TiCl_3$(TAC-131) was suspended in 1 liter of purified kerosene, and then 1.2 moles of 2-ethylhexyl alcohol (EHA) was added. The mixture was heated to 100° C. to form a green uniform solution.

COMPARATIVE EXAMPLE 1

Ethylene was continuously polymerized in the same way as in Example 5 except that a suspension of solid $TiCl_3$(TAC-131) in kerosene was used instead of the kerosene solution of $TiCl_3$(TAC-131) and 2-ethylhexyl alcohol as a transition metal compound. Polyethylene was not obtained at all.

COMPARATIVE EXAMPLE 2

Ethylene was polymerized continuously in the same way as in Example 6 except that the aluminum-magnesium complex was not fed into the polymerization reactor.

The concentration of the resulting polyethylene was 4 g/liter, and the polymerization activity was 1,300 g of polyethylene/millimole of Ti.

EXAMPLE 7

A magnesium-aluminum containing complex was prepared in the same way as in Example 3 except that 0.75 millimole of triethyl aluminum was used instead of 1.0 millimole of triethyl aluminum (at this time, the mole ratio of butanol to triethyl aluminum was 4:3).

A 24-liter pressure polymerization apparatus for continuous operation was charged continuously with 3 liters/hr of purified hexane, 0.6 millimole/hr of triethyl aluminum, 0.6 millimole/hr of diethyl aluminum monochloride, 0.3 millimole/hr, calculated as magnesium atom, of the magnesium-aluminum complex obtained as above, and 0.015 millimole/hr, calculated as titanium atom, of a hexane solution of Ti(O n-C$_4$H$_9$)$_4$ (the total amount of hexane used to dilute the catalyst ingredients was adjusted to 3 liters/hr). Ethylene was thus polymerized continuously at 80° C. The molecular weight of polyethylene was controlled by feeding hydrogen, and ethylene was continuously fed so that the total pressure in the polymerization apparatus reached 8 kg/cm$^2$. The average residence time was 2 hours.

Polyethylene was obtained in a yield of 590 g/hr, which corresponded to a polymerization activity of 39,000 g of polyethylene/millimole of Ti. The polymer had a melt index of 5.3.

EXAMPLE 8

A 2-liter glass vessel for continuous polymerization under atmospheric pressure (overflow type) was charged continuously and separately with 0.4 liter/hr of dehydrated and purified kerosene, 0.7 millimole/hr of triisobutyl aluminum, 2.3 millimoles/hr of diethyl aluminum monochloride, 1.28 millimoles/hr of 2-ethylhexanol, 0.3 millimole/hr, calculated as magnesium atom, of the magnesium-aluminum complex obtained in Example 1, and 0.03 millimole/hr, calculated as titanium atom, of a kerosene solution of Ti(OC$_8$H$_{17}$)$_4$ (at this time, the total amount of the solvent used to dilute the catalyst ingredients was adjusted to 0.6 liter/hr). At the same time, a gaseous mixture of ethylene and propylene (ethylene/propylene mole ratio=40/60) was fed into the polymerization vessel at a rate of 200 liters/hr, and polymerized at 90° C.

During the continuous polymerization, the polymer solution was a uniform clear solution without the formation of gel.

The polymerization product was precipitated with a large amount of methanol to afford an ethylene-propylene copolymer at a rate of 31 g/hr. The polymerization activity at this time was 1030 g of the copolymer/millimole of Ti. The copolymer had a melt index of 3.1 and an ethylene content of 75.0 mole%. The content of a boiling methyl acetate-soluble portion of the copolymer was 0.7%, and the copolymer was scarcely sticky. A sheet having a thickness of 1 mm prepared from the copolymer in a customary manner had a haze of 17%.

COMPARATIVE EXAMPLE 3

Commercially available anhydrous magnesium chloride (0.5 mole) was suspended in 1 liter of purified kerosene, and with stirring, 3.0 moles of ethanol was added. The mixture was reacted at room temperature for 1 hour. Then, 1.40 mole of diethyl aluminum chloride was added dropwise, and the mixture was stirred at room temperature for 1.5 hours. Then, 0.3 mole of TiCl$_4$ and 0.3 mole of triethyl aluminum were added, and the mixture was stirred at room temperature for 4 hours. After the reaction, the mixture became a suspension of a light brown powder. A part of the solid portion was taken out, dried and analyzed. It was found that titanium was deposited in an amount of 53 mg/g of solid.

Ethylene and propylene were copolymerized in the same way as in Example 8 except that the titanium-containing solid catalyst obtained as above was used instead of the magnesium-aluminum complex and the kerosene solution of Ti(OC$_8$H$_{17}$)$_4$. The polymer solution was whitely turbid with floating of particles (considered to be crystals).

The copolymer was obtained at a rate of 25 g/hr. The polymerization activity was 830 g of copolymer/millimole of Ti. The copolymer had a melt index of 7.2 and an ethylene content of 73 mole%. The content of the boiling methyl acetate-soluble portion of the copolymer was 2.0%, and the copolymer was very sticky. A sheet having a thickness of 1 mm produced from the copolymer in a customary manner had a haze of 46%.

What we claim is:

1. In a process for producing a polymer or a copolymer of an alpha-olefin having 2 to 12 carbon atoms which comprises continuously polymerizing or copolymerizing said alpha-olefin or alpha-olefin with up to 5 mole % of a diolefin in the presence of a catalyst comprising a transition metal catalyst component and an organo-aluminum catalyst component; the improvement wherein:

[I] said polymerization or copolymerization is carried out in the presence of a catalyst composed of:
 (A) a solid magnesium compound obtained by reacting (i) an adduct between a magnesium halide and an electron donor selected from the group consisting of an alcohol with 1 to 18 carbon atoms, an aldehyde with 2 to 15 carbon atoms, a carboxylic acid with 2 to 18 carbon atoms and an amine, with (ii) an organoaluminum compound having the following formula:

$$R^1{}_m Al(OR^2)_n H_p X_q$$

wherein R$^1$ and R$^2$ are identical or different and represent a hydrocarbon group having 1 to 5 carbon atoms, X represents halogen, m is a number in the range of 0 < n ≦ 3, n is a number in the range of 0 ≦ n < 3, p is a number in the range of 0 ≦ p < 3, and q is a number in the range of 0 ≦ q < 3 and m+n+p+q=3, or having the following formula:

$$M^1 Al R^1{}_4$$

wherein M$^1$ represents Li, Na or K, and R$^1$ is the same as defined above,
 (B) a liquid titanium or vanadium metal compound, and
 (C) an organoaluminum compound, and

[II] said continuous polymerization or copolymerization is carried out while feeding compound (B) separately from other compounds (A) and (C) into a polymerization or copolymerization zone, components (A), (B), and (C) being fed continuously to said zone.

2. The process of claim 1 wherein said polymerization or copolymerization is carried out in a hydrocarbon solvent, the concentration of the transition metal compound in the polymerization or copolymerization zone is in the range of 0.0005 to about 1 millimole/liter calculated as transition metal, the atomic ratio of the transition metal compound to the magnesium compound is from 0.005 to about 1, and the atomic ratio of the organoaluminum compound to the transition metal compound is from about 5 to about 2,000.

3. The process of claim 1 wherein said transition metal compound is a titanium compound.

4. The process of claim 3 wherein said titanium compound is a tetravalent titanium compound.

5. The process of claim 3 wherein said titanium compound is a liquid trivalent titanium compound obtained by treatment with an electron donor.

6. The process of claim 2 wherein said polymerization or copolymerization is carried out under such conditions that the resulting polymer or copolymer dissolves in said solvent.

7. The process of claim 1 wherein the liquid transition metal compound is a titanium compound selected from the group consisting of a tetravalant titanium compounds of the formula:

$$Ti(OR)_n X_{4-n}$$

wherein
R represents a hydrocarbon group,
X represents a halogen atom, and $0 \leq n \leq 4$, and a liquid trivalent titanium obtained by treatment with an electron donor selected from the group consisting of an alcohol, ether, ester, amine, and ketone; and wherein said organoaluminum compound (C) is selected from the group consisting of trialkylaluminums and alkylaluminum halides or mixtures thereof.

8. The process of claim 7 wherein said electron donor used to form said adduct (i) comprises at least one member selected from the group consisting of alcohols having at least 6 carbon atoms, amines having at least 6 carbon atoms, and carboxylic acids having at least 7 carbon atoms, and said adduct is formed by contacting the magnesium dihalide with the electron donor in an inert hydrocarbon solvent at a temperature of from about 80° C. to about 300° C. for a period of from about 15 minutes to about 5 hours.

9. The process of claim 1 which comprises continuously copolymerizing at least one of ethylene and propylene with another alpha olefin or a diolefin.

* * * * *